Patented June 9, 1953

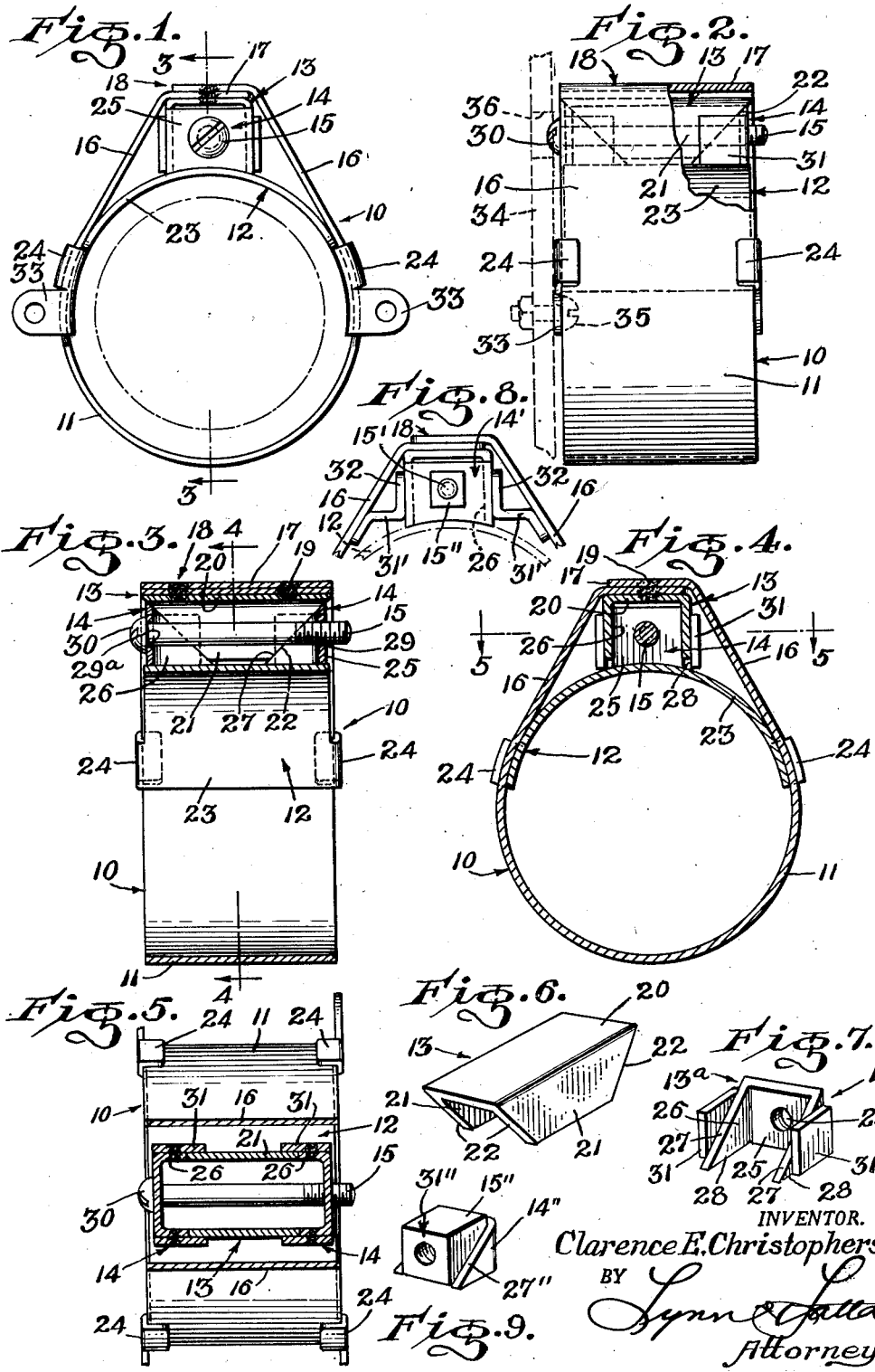

2,641,038

UNITED STATES PATENT OFFICE 2,641,038

AXIALLY TIGHTENING BAND CLAMP

Clarence E. Christophersen, Inglewood, Calif., assignor to Marman Products Company, Inc., Inglewood, Calif., a corporation of California Application July 18, 1951, Serial No. 237,458

10 Claims. (Cl. 24—243)

This invention relates to band clamps, and has as its general object to provide a band clamp having tightening means including a rotatable actuator element disposed parallel to the axis of the clamp. The invention contemplates a clamp which is particularly useful for mounting a round member (such as a measuring or indicating instrument) to a panel (e. g., an instrument panel), although it is also useful for mounting any type of round or tubular member upon a panel or partition through which the tubular member extends on an axis at right angles to the plane of such panel or partition.

A further object is to provide such a band clamp, adapted to be attached to the rear side of an instrument panel and having an actuator which is accessible from the front side of the panel.

A further object is to provide such a band clamp which may be constructed relatively simply and inexpensively, largely from sheet metal parts.

Other objects will become apparent in the ensuing specification and appended drawings in which:

Fig. 1 is a front end view of a band clamp embodying the invention;

Fig. 2 is a side view thereof, with parts broken away and shown in section;

Fig. 3 is an axial sectional view of the band clamp;

Fig. 4 is a transverse sectional view of the band clamp;

Fig. 5 is a detail sectional view taken on the line 5—5 of Fig. 4;

Fig. 6 is a perspective view of one of the wedging elements of the clamp;

Fig. 7 is a perspective view of another wedging element of the clamp;

Fig. 8 is a detail view of a modified form of the invention; and

Fig. 9 is a perspective view of a modified form of movable wedge.

As an example of one form in which the invention may be embodied, I have shown in the drawing a band clamp which embodies, in general: a band section 10 having a loop portion 11 adapted to extend around the major portion of the circumference of a member to be clamped; a band section 12 in the form of a yoke the ends of which are circumferentially slidable relative to the band section 10; an actuator mechanism including a fixed wedge 13 carried by the band section 10, a pair of movable wedges 14 cooperating with the respective ends of the fixed wedge 13, and slidably engaged against the crown of the yoke 12, and an actuator screw 15 cooperating with the movable wedges 14 in a manner to draw them toward each other along a path parallel to the axis of the clamp, whereby to exert radially outward pressure against the fixed wedge 13 and radially inward pressure against the yoke member 12, for constricting the clamp. Band sections 10 and 12 are shaped to cooperatively define a circular band which can be constricted by the sliding of the ends of yoke 12 upon band section 10.

The band section 10 is constructed simply from a length of ribbon metal, the intermediate portion thereof forming the loop portion 11 and the end portions thereof being extended tangentially from the loop portion 11 to define side arms 16 of a saddle 18 having as its outer extremity a seat 17 on which the fixed wedge 13 is supported.

The actuator mechanism is disposed in the space defined between saddle 18 and yoke 12, the axis of actuator screw 15 being disposed in the axial plane of the clamp which is also the median plane of saddle 18. The seat 17 is constituted by the end extremities of band 10, bent toward each other from arms 16, overlapped, and secured together in face to face attachment by suitable means such as a spot weld or welds 19 (Fig. 4). The fixed wedge 13 is of channel section, including a web portion 20 the outer face of which is attached to the inner face of seat 17 by the same spot weld or welds 19 which secure the ends of band 10 together. Extending radially inwardly from web portion 20 are side flanges 21 which are disposed equidistantly on either side of the median radial plane of saddle 18, parallel to the axis of band 10.

The ends of flanges 21 are cut on a bias to provide wedging ramps 22 which converge inwardly toward the axis of the clamp. The inner extremites of flanges 21 function as stops to define the outer limit of expanding or retracting movement of yoke 12 away from the cooperating loop portion 11. From this outer limit, which determines the maximum diameter of the clamp, the yoke 12 may be moved inwardly to constrict the clamp.

Yoke 12 comprises a sheet metal stamping including the substantially semicircular arched body portion 23 having a width which may match that of band 10, and tabs extending laterally from the respective sides of each end portion thereof, and bent around the respective edges of band 10 to provide channel shaped slides 24 which embrace and are slidable upon the respective side portions of band 10.

Movable wedges 14 are of U-shape, each including a web portion 25 and triangular shaped arms 26 bent at right angles from the respective ends of web portion 25, parallel to each other, and spaced apart the same distance as flanges 22, whereby to provide inclined wedging ramps 27 which register with and engage the ramps 22 of fixed wedge 13. The arms 26 have bottom edges 28, disposed in a plane at right angles to web 25, and slidably bearing against the outer face of yoke 12 at the crown (center of web portion 23) thereof. Wedges 14 in the webs 25 thereof are provided with respective apertures, i. e., a threaded aperture 29 (Fig. 7) into which the end of screw 15 is threaded, and a plain aperture 29a in which the headed end of screw 15 is journalled. Head 30 of screw 15 bears against one of the wedges 14, and the threaded end of screw 15 engages the other wedge 14 through its threaded connection therewith, whereby upon forward rotation of screw 15, the wedges 14 will be drawn toward each other and forced inwardly by the wedging action of ramps 22, 27.

To maintain the wedging ramps 22, 27 in full registering engagement, suitable guide or positioning means is provided. Such means may comprise guide blocks 31 secured (e. g. by welding) to the respective outer sides of wedge arms 26, said guide blocks 31 having portions thereof projecting beyond ramps 27 and embracing the respective end portions of flanges 21 of the fixed wedge 13. Alternatively, such guide means may comprise Z-brackets 31' (Fig. 8) attached to arms 16 of band 10 and having spaced parallel portions 32 embracing the respective side arms 26 of wedges 14'.

For mounting the clamp upon the rear face of an instrument panel or the like, the end portions of yoke 12 may be extended to form apertured ears 33, disposed in a common plane at the forward end of the clamp, whereby said end may be mounted against a mounting panel 34. Fig. 2 illustrates how flanges 33 may be attached to a panel 34 by means of bolts 35, with head 30 of actuator screw 15 exposed in an opening 36 in panel 34, for actuation by a screw-driver.

It is to be understood that, without departing from the invention, various other modifications of the details of structure, such as the substitution of a bolt 15' with separate nut 15'' (Fig. 8) instead of screw 15; or solid movable wedges 14'' (Fig. 9) having central guide portions 31'' protruding beyond shoulder-like ramps 27'' and receivable between flanges 21, instead of the movable wedges 14, may be utilized.

In the operation of the clamp, the band sections 10, 12 are constricted toward each other by rotating the screw 15 in the forward direction; drawing the movable wedges 14 axially toward each other and forcing the fixed wedge 13 and saddle 13 outwardly, thus drawing the ends of band loop portion 11 through the slides 24 to reduce the circumference of the band. To loosen the clamp, the screw 15 is rotated in the reverse direction allowing the wedges 14 to relax away from each other.

I claim:

1. In a band clamp with axially disposed actuator; a clamping band comprising outer and inner sections, said outer section including a loop portion and a saddle projecting radially outwardly from the extended periphery thereof, and said inner band section being of arcuate yoke form, having end portions slidably connected to the respective side portions of said outer section and a crown portion disposed radially inwardly of the outer portion of said saddle to define an actuator space, and actuator means disposed in said space and including first and second wedge means disposed in end to end array extending parallel to the axis of the clamp, said first and second wedge means comprising respectively a fixed intermediate wedge secured to one of said band sections and a pair of movable wedges wedgingly engaged with the respective ends of said fixed wedge for radially wedging action and having axially slidable bearing engagement against the other of said band sections; and actuator screw means extending through the respective movable wedges and operable, upon rotation thereof, to draw said movable wedges toward each other so as to effect a radially expanding action of said wedges between the respective band sections.

2. A clamp as defined in claim 1, wherein said fixed wedge is secured to the inner side of the outer extremity of said saddle and said movable wedges slidably bear against the outer face of the central portion of said inner band section.

3. A clamped as defined in claim 1, wherein said inner band section has integral end tabs bent around the respective edges of said outer band section to form slides slidably receiving a respective portion of said outer band section.

4. A clamp as defined in claim 1, wherein said fixed wedge is of channel section including a web portion attached to its respective band section and a pair of side flanges, the ends of which are biased in converging relation to provide wedging ramps, and wherein said respective movable wedges are U-shape stampings each comprising an apertured web portion through which said actuator extends and a pair of side arms of triangular shape providing wedging ramps engaging the end ramps of said fixed wedge.

5. In a band clamp with axially disposed actuator, an outer band section including a loop portion and a saddle projecting radially beyond the extended circumference thereof, said saddle including a pair of side arms constituting tangent continuations of said loop portion and, at the outer extremity thereof, a seat disposed normal to the median plane of said saddle and bridging the outer ends of said side arms, an inner band section of arcuate yoke form having end portions slidably connected to the respective edges of said outer band section and having a central crown portion spaced radially inwardly from said seat and defining with said saddle an actuator space; and actuator mechanism for constricting said band, comprising a pair of movable wedges and a fixed wedge disposed between said movable wedges in an array extending parallel to the axis of the clamp within said actuator space, said fixed wedge being attached to the inner face of said seat and said movable wedges being disposed in wedging engagement with the respective ends of said fixed wedge and in slidable bearing engagement with the outer face of said crown portion of the yoke; and an actuator screw rotatably extended through one of said movable wedges and in threaded engagement with the other of said movable wedges for drawing them toward each other to force said fixed wedge outwardly, thereby exerting outward pressure against said saddle and inward pressure against said inner band section.

6. A clamp as defined in claim 5, wherein said fixed wedge is of channel section including a web portion welded to the inner face of said seat and side arms extending radially inwardly, the ends of said side arms being biased to provide inwardly converging ramps against which said movable wedges are wedgingly engaged.

7. A clamp as defined in claim 6, wherein said movable wedges are provided with guide means embracing the respective end portions of said fixed wedge to maintain said movable wedges in register with said fixed wedge.

8. A clamp as defined in claim 7, wherein said movable wedges are of U-shape, including web portions in which said actuator screw is respectively threaded and rotatably mounted, said web portions being remotely disposed and said movable wedges further including flat side arms extending from said web portions in the plane of said fixed wedge flanges, into wedging engagement with the ramps thereof, said guide means comprising parts carried by the respective side arms.

9. A clamp as defined in claim 1, wherein said fixed wedge is of channel section including a web portion attached to its respective band section and a pair of side flanges the ends of which are biased in converging relation to provide wedging ramps, and wherein said respective movable wedges have central portions slidably embraced between said flanges at the respective ends of said fixed wedge and shouldered ramps at the respective sides thereof, mating with said end ramps of the fixed wedge.

10. A clamp as defined in claim 5, wherein said fixed wedge is of channel section including a web portion welded to the inner face of said seat and side arms extending radially inwardly, the ends of said side arms being biased to provide inwardly converging ramps against which said movable wedges are wedgingly engaged, said movable wedges being provided with guide means embracing the respective end portions of said fixed wedge to maintain said movable wedges in register with said fixed wedge, said guide means comprising spaced slots parallel guide members carried by the respective side arms of said outer band section and embracing said movable wedges.

CLARENCE E. CHRISTOPHERSEN.

References Cited in the file of this patent

UNITED STATES PATENTS

| Number | Name | Date |
|---|---|---|
| 684,835 | Littel | Oct. 22, 1901 |
| 918,407 | Wiest | Apr. 13, 1909 |
| 1,442,909 | Ryan | Jan. 23, 1923 |
| 1,540,084 | Parker | June 2, 1925 |
| 1,736,630 | Scharpenberg | Nov. 19, 1929 |
| 2,205,474 | Goeller | June 25, 1940 |